US008625640B2

(12) United States Patent
Wei (10) Patent No.: US 8,625,640 B2
(45) Date of Patent: Jan. 7, 2014

(54) TRANSPARENT CLOCKS IN ACCESS NETWORKS (75) Inventor: Dong Wei, Austin, TX (US)

(73) Assignee: Futurewei Technologies, Inc., Plano, TX (US)

(*) Notice: Subject to any disclaimer, the term of this patent is extended or adjusted under 35 U.S.C. 154(b) by 134 days.

(21) Appl. No.: 13/194,519

(22) Filed: Jul. 29, 2011

(65) Prior Publication Data

US 2012/0027414 A1 Feb. 2, 2012

Related U.S. Application Data (60) Provisional application No. 61/369,911, filed on Aug. 2, 2010.

(51) Int. Cl.
*H04J 3/06* (2006.01)

(52) U.S. Cl.
USPC .......................................................... 370/503

(58) Field of Classification Search
USPC ........... 370/350, 503–510, 512; 375/354–356
See application file for complete search history.

(56) References Cited

U.S. PATENT DOCUMENTS 8,095,615 B2 * 1/2012 Briscoe et al. ................ 709/208
2011/0296226 A1 * 12/2011 Sorbara et al. ................ 713/400

FOREIGN PATENT DOCUMENTS

| CN | 101404618 A | 4/2009 |
| CN | 101547083 A | 9/2009 |
| CN | 101582733 A | 11/2009 |
| CN | 101790230 A | 7/2010 |

OTHER PUBLICATIONS

Vetter et al, System Aspeccts of APON/VDSL Deployment, IEEE, 7 pages, May 2000.*
"Draft Standard for a Precision Clock Synchronization Protocol for Networked Measurement and Control Systems," IEEE P1588™ D2.2, 2007, 305 pages.
"Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications," IEEE 802.3 ah, 2005, 417 pages.
"Draft Standard for Information Technology—Telecommunications and Information Exchange Between Systems—Local and Metropolitan Area Networks—Specific Requirements, Part 3: Carrier Sense Multiple Access With Collision Detection (CSMA/CD) Access Method and Physical Layer Specifications, Amendment: Physical Layer Specifications and Management Parameters for 10 Gb/s Passive Optical Networks," IEEE P802.3av™ D2.2, Dec. 3, 2008, 267 pages.

(Continued)

*Primary Examiner* — Frank Duong
(74) *Attorney, Agent, or Firm* — Conley Rose, P.C.; Grant Rodolph; Rayhao Chung (57) ABSTRACT An apparatus comprising a device at an access node (AN) comprising an interface, a Precision Time Protocol (PTP) engine, and a timestamp module, and a second device at a customer premise node coupled to the AN and comprising a second interface, a second PTP engine, and a second timestamp module, wherein the device at the AN is configured to send a PTP event message to the device at the customer premise node to implement a transparent clock (TC) scheme, wherein the PTP engine is configured to trigger the timestamp module to send a timestamp to the customer premise node when the PTP event message transverses the interface, and wherein the second PTP engine is configured to trigger the second timestamp module to create a second timestamp when the PTP event message transverses the second interface.

17 Claims, 6 Drawing Sheets

(56) References Cited

OTHER PUBLICATIONS

"Series G: Transmission Systems and Media, Digital Systems and Networks, Digital Sections and Digital Line Systems for Local and Access Networks, Broadband Optical Access Systems based on Passive Optical Networks (PON)," ITU-T G.983.1, Jan. 2005, 124 pages.

"Series G: Transmission Systems and Media, Digital Systems and Networks, Digital Sections and Digital Line System-Optical Line Systems for Local and Access Networks, Gigabit-Capable Passive Optical Networks (GPON): General Characteristics," ITU-T G. 984.1, Mar. 2008, 43 pages.

"Series G: Transmission Systems and Media Digital Systems and Networks, Digital Scetions and Digital Line System-Access Networks, Very High Speed Digital Subscriber Line Transceivers 2 (VDSL2)," ITU-T G. 993.2, Feb. 2006, 252 pages.

"IEEE Standard for a Precision Clock Synchronization Protocol for Networked Measurement and Control Systems," IEEE 1588™, 2008, 289 pages.

Foreign Communications from a Counterpart Application, PCT Application PCT/CN2011/077876, International Search Report, dated Oct. 27, 2011, 3 pages.

"Series G: Transmission Systems and Media, Digital Systems and Networks. Digital sections and digital line system—Optical line systems for local and access networks, 10-Gigabit-capable passive optical networks (XG-PON): Transmission convergence (TC) layer specification," ITU-T G.987.3, Oct. 2010, 134 pages.

Goodson, R., et al. "Proposal for Discrete Transparent Clock Mechanism for XGPON" Study Group 15, Question 2, Working Party 1, Conference Call, Document R-C-TD, Oct. 12, 2010, 7 pages.

Han, J., et al., "A Clock Synchronization System with IEEE 1588-2008 Adapters over Existing Gigabit Ethernet Equipment," XP31725216A, Proceedings of 2010 IEEE International Symposium on Circuits and Systems (ISCAS), May 30—Jun. 2, 2010 pp. 193-196.

Kohler, D., "A Practical Implementation of an IEEE1588 Supporting Ethernet Switch," XP31161292A, International IEEE Symposium on Precision Clock Synchronization (ISPCS) for Measurement, Control and Communication, Vienna, Austria, Oct. 1-3, 2007, pp. 134-137.

Lee, S., "An Enhanced IEEE 1588 Time Synchronization Algorithm for Asymmetric Communication Link using Block Burst Transmission," XP11234346A, IEEE Communications Letters, vol. 12, No. 9, Sep. 2008, pp. 687-689.

Rodrigues, S., "IEEE-1588 and Synchronous Ethernet in Telecom," XP31161293A, Internationa IEEE Symposium on Precision Clock Synchronization (ISPCS) for Measurement, Control and Communication, Vienna, Austria, Oct. 1-3, 2007, pp. 138-142.

\* cited by examiner

TRANSPARENT CLOCKS IN ACCESS NETWORKS

CROSS-REFERENCE TO RELATED APPLICATIONS

The present application claims benefit of U.S. Provisional Patent Application No. 61/369,911 filed Aug. 2, 2010 by Dong Wei and entitled, "Method for Transparent Clocks in Access Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. Other PON systems, such as ten Gigabit PON (XGPON) systems, may have a downstream bandwidth of about ten Gbps and an upstream bandwidth of at least about 2.5 Gbps. Further, some PON systems, such as Ethernet PON (EPON) systems, may support Ethernet technology.

Digital Subscriber Line (DSL) technology is a high-bandwidth and/or high-speed data transmission technology implemented using twisted pair wires, e.g. unshielded twisted pairs to provide bandwidth for digital communications over existing subscriber lines. For example, DSL technologies include Asymmetrical Digital Subscriber Line (ADSL), ADSL Version 2 (ADSL2), ADSL2 plus (ADSL+), Very-high-bit-rate Digital Subscriber Line (VDSL), and VDSL Version 2 (VDSL2). DSL may deliver high-speed data services from a distribution center, or central office (CO), to a plurality of customer premise equipments (CPEs).

SUMMARY

In one embodiment, the disclosure includes an apparatus comprising a device at an access node (AN) comprising an interface, a Precision Time Protocol (PTP) engine, and a timestamp module, and a second device at a customer premise node coupled to the AN and comprising a second interface, a second PTP engine, and a second timestamp module, wherein the device at the AN is configured to send a PTP event message to the device at the customer premise node to implement a transparent clock (TC) scheme, wherein the PTP engine is configured to trigger the timestamp module to send a timestamp to the customer premise node when the PTP event message transverses the interface, and wherein the second PTP engine is configured to trigger the second timestamp module to create a second timestamp when the PTP event message transverses the second interface.

In another embodiment, the disclosure includes a network component comprising a receiver configured to receive a PTP event message and a first timestamp from an AN, a logic circuit configured to create a second timestamp based on a local clock upon receiving a trigger from an upper network layer operating at the network component and update a header in the PTP event message based on the first timestamp and the second timestamp, and a transmitter configured to forward the PTP event message with the updated header.

In yet another embodiment, the disclosure includes a method comprising sending a first timestamp from a network node, receiving a trigger from an upper network layer upon detecting a received PTP event message, creating a second timestamp, computing a residence time based on the first timestamp and the second timestamp, updating a header in the PTP event message with the residence time, and forwarding the PTP event message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems based on DSL and PON technologies are attractive candidates for mobile backhaul due to their availability, relatively high bandwidth, and low cost. In these systems, data are exchanged between a distribution or AN and a customer premise node. Combining these technologies with microcells and Long-Term Evolution (LTE) base stations may extend a mobile network, which may protect investments in the "last-mile" network and provide a cost-effective cellular backhaul to support third generation (3G) or fourth generation (4G) systems.

Mobile backhaul systems require frequency and time synchronization with sub-microsecond precision. Synchronization methods such as the PTP defined in the Institute of Electrical and Electronics Engineers (IEEE) 1588-2008 standard, which is incorporated herein by reference, have been designed to distribute Time of Day (ToD) data and hence synchronize clocks across packet transport networks. A boundary clock (BC) scheme may maintain the time scale used in a domain based on multiple PTP ports in the domain. A TC scheme is a domain independent mechanism designed to synchronize nodes across the network and provide corrections for a residence time across network components, such as bridges, routers, or repeaters. A residence time across network components is the transit time of a data packet through the network components. A residence time for a particular network component is a transit time of a data packet entering and exiting the particular network component. The TC is configured to measure the time taken for a PTP event message to transit a device or network component and provide this information to clocks receiving the PTP event message. However, the AN and the customer premise node in PON and DSL systems are not geographically co-located, which may pose a challenge for implementing a TC scheme.

Disclosed herein is a system and method for implementing a TC scheme between nodes in mobile backhaul networks, such as PON and DSL systems. The TC scheme may enable PON and DSL network components or devices to support PTP in compliance with IEEE 1588-2008 standard. Specifically, the transit time of a PTP event message across a device may be measured and forwarded to a plurality of clocks receiving the PTP event message. A first PTP engine at an upper layer at a first node, e.g., an AN, may trigger the first node to create a first timestamp using a local clock upon receiving a PTP event message. This timestamp may be transmitted to a second node, e.g., a customer premise node. Upon receiving the PTP event message, a second PTP engine at an upper layer at of the second node may trigger the second node to create a second timestamp using a local clock. Upon receiving the first and second timestamp, the second node may then report the residence time between the two timestamps and update a PTP packet header with the residence time.

The first and second nodes may be any devices that forward packets within a packet transport network. The nodes may be the originator or final recipient of the packets or may be nodes that forward received packets to other nodes. The nodes may have different properties, such as physical structure, capacity, and/or transmission speed. The first node may correspond to an AN, and the second node may correspond to a customer premise node, for instance, in a PON system or a DSL system. In embodiments of PON systems, the AN may be an OLT and the customer premise node may be an ONU. In embodiments of DSL systems, the AN may be a DSL Exchange or Cabinet (described below), and the customer premise node may be a CPE, e.g., a modem.

Figure 1:
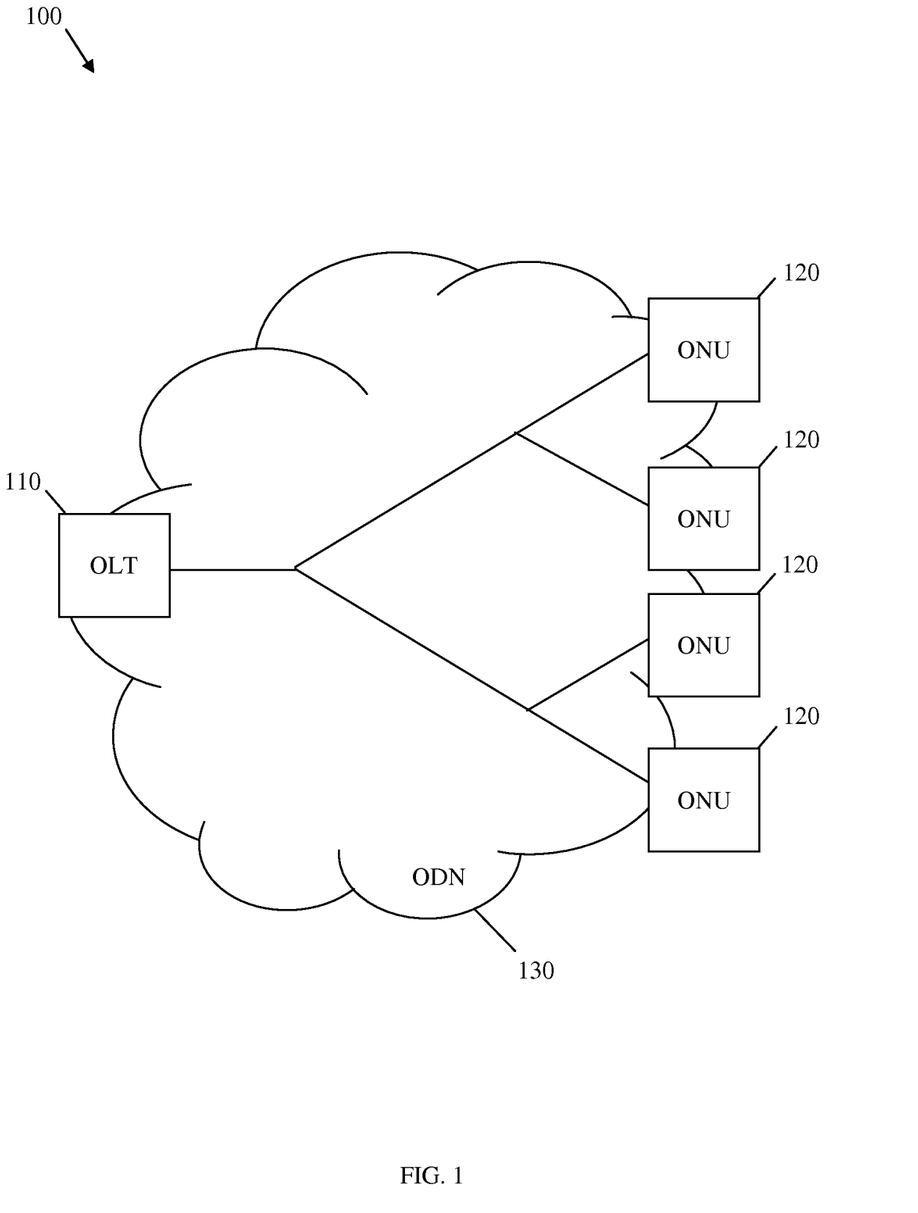
FIG. 1 is a schematic diagram of an embodiment of a PON system.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a XGPON system, which may have a downstream bandwidth of about ten Gbps and an upstream bandwidth of at least about 2.5 Gbps. Alternatively, the PON 100 may be any Ethernet based network, such as an EPON defined by the IEEE 802.3ah standard, a ten Gigabit EPON as defined by the IEEE 802.3av standard, an asynchronous transfer mode PON (APON), a broadband PON (BPON) defined by the ITU-T G.983 standard, a GPON defined by the International Telecommunication Union (ITU) Standardization Sector (ITU-T) G.984 standard, or a wavelength division multiplexed (WDM) PON (WPON), all of which are incorporated herein by reference.

In an embodiment, the OLT 110 may be any device that is configured to communicate with the ONUs 120 and another network (not shown). Specifically, the OLT 110 may serve as an AN that acts as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may serve as customer premise nodes that act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

Figure 2:
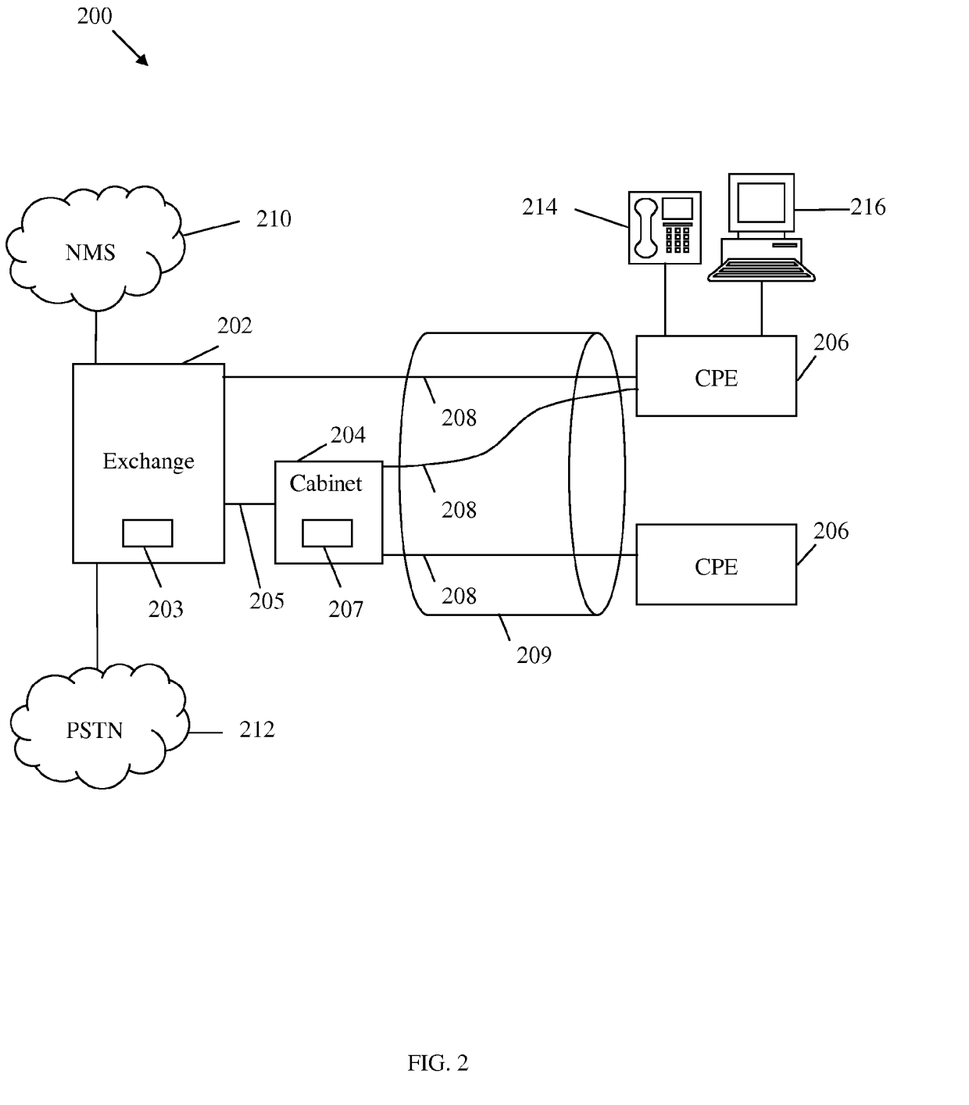
FIG. 2 is a schematic diagram of an embodiment of a DSL system.

FIG. 2 illustrates one embodiment of a Digital Subscriber Line (DSL) system 200. The DSL system 200 may be a Very-high-bitrate DSL version 2 (VDSL2) system, an Asymmetric DSL version 2 (ADSL2) system, an ADSL2 plus (ADSL2+) system, or any other DSL system. The DSL system 200 may comprise an Exchange 202, optionally a Cabinet 204 coupled to the Exchange 202 by a cable 205, and a plurality of CPEs 206, which may be coupled to the Exchange 202 and/or the Cabinet 204 via a plurality of subscriber lines 208. At least some of the subscriber lines 208 may be bundled in a binder 209. Additionally, the DSL system 200 may optionally comprise a network management system (NMS) 210 and a public switched telephone network (PSTN) 212, both of which may be coupled to the Exchange 202. In other embodiments, the DSL system 200 may be modified to include splitters, filters, management entities, and various other hardware, software, and functionality.

The NMS 210 may be a network management infrastructure that processes data exchanged with the Exchange 202 and may be coupled to one or more broadband networks, such as the Internet. The PSTN 212 may be a network that generates, processes, and receives voice or other voice-band signals. In an embodiment, the Exchange 202 may be a server located at a CO and may comprise switches and/or splitters, which may couple the NMS 210, the PSTN 212, and the subscriber lines 208. For instance, the splitter may be a 2:1 coupler that forwards data signals received from the subscriber lines 208 to the NMS 210 and the PSTN 212, and forwards data signals received from the NMS 210 and the PSTN 212 to the subscriber lines 208. Further, the splitter may optionally comprise one or more filters to help direct data signals between the NMS 210, the PSTN 212, and the subscriber line 208. Additionally, the Exchange 202 may serve as an AN and may comprise at least one DSL transmitter/receiver (transceiver), which may exchange signals between the NMS 210, the PSTN 212, and the subscriber lines 208. The signals may be received and transmitted using the DSL transceiver, such as a modem. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 202 may be configured to transmit data at similar or different rates for each subscriber line 208.

In an embodiment, the Cabinet 204 may be located at a distribution center between the central office (CO) and customer premises and may comprise switches and/or splitters, which may couple the Exchange 202 to the CPEs 206. The Cabinet 204 may serve as an AN and may comprise a Digital Subscriber Line Access Multiplexer (DSLAM) 207 that couples the Exchange 202 to the CPEs 206. Additionally, the Cabinet 204 may comprise a DSL transceiver, which may be used to exchange signals between the Exchange 202 and the CPEs 206. The DSL transceiver may process the received signals or may simply pass the received signals between the CPEs 206 and the Exchange 202. The splitter in the Cabinet 204 may be a N:1 coupler (where N is an integer) that routes data signals received from the Exchange 202 to N CPEs 206, and routes data signals received from the N CPEs 206 to the Exchange 202. The data signals may be transmitted and received using the DSL transceiver, which may be a modem. Further, the splitter of the Cabinet 204 may optionally comprise one or more filters to help direct data signals between the Exchange 202 and the CPEs 206 via the corresponding subscriber lines 208. In an embodiment, the DSL transceiver may be configured to transmit data to the CPEs 206 at similar or different rates and/or power for each subscriber line 208, as described in detail below.

In an embodiment, the CPEs 206 may be located at the customer premises, where at least some of the CPEs 206 may be coupled to a telephone 214 and/or a computer 216. The telephone 214 may be hardware, software, firmware, or combinations thereof that generates, processes, and receives voice or other voice-band signals. The CPE 206 may serve as a customer premise node and comprise a switch and/or a splitter, which may couple the subscriber lines 208 and the telephone 214 and the computer 216. The CPE 206 may also comprise a DSL transceiver to exchange data between the CPE 206 and the Exchange 202 via the subscriber line 208. For instance, the splitter may be a 2:1 coupler that forwards data signals received from the subscriber line 208 to the telephone 214 and the DSL transceiver, and forwards data signals received from the telephone 214 and the DSL transceiver to the subscriber line 208. The splitter may optionally comprise one or more filters to help direct data signals to and from the telephone 214 and the DSL transceiver. The DSL transceiver, e.g. a modem, may transmit and receive signals through the subscriber lines 208. For instance, the DSL transceiver may process the received signals to obtain the transmitted data from the Exchange 202, and pass the received data to the telephone 214, the computer 216, or both. The CPEs 206 may be coupled to the Exchange 202 directly via the subscriber lines 208 and/or via the subscriber lines 208 and the Cabinet 204. For example any of the CPEs 206 may be coupled to a subscriber line 208 from the Exchange 202 and/or a subscriber line 208 from the Cabinet 204. The CPEs 206 may access the NMS 210, the PSTN 212, and/or other coupled networks via the subscriber lines 208 deployed by the Exchange 202 and/or the Cabinet 204.

Figure 3:
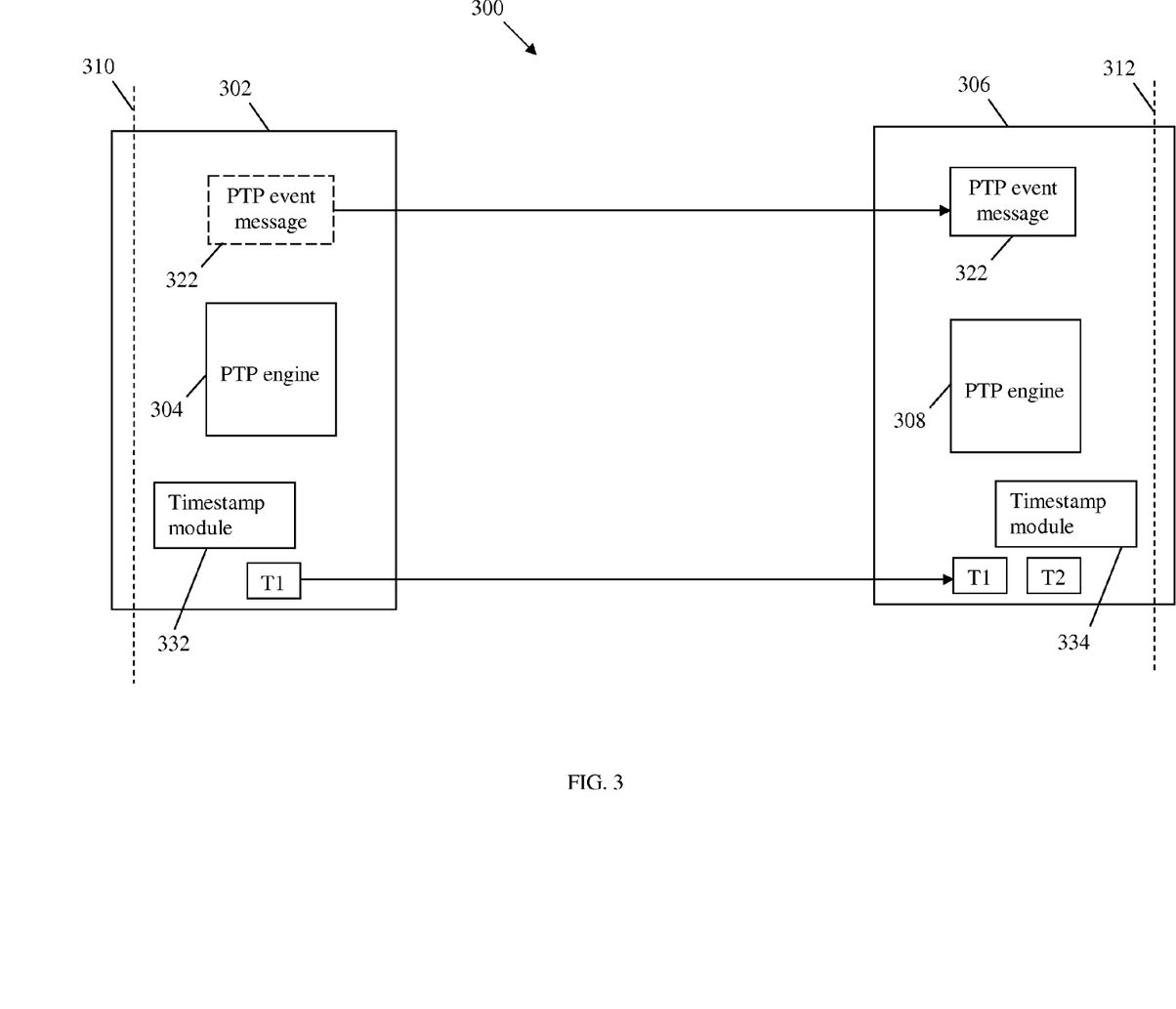
FIG. 3 is an illustration of an embodiment of a TC synchronization scheme.

Nodes within a packet transport network, e.g., the PON 100 and/or the DSL system 200 may have to synchronize their clocks with the clocks in other nodes within the network. FIG. 3 illustrates a diagram of a TC synchronization scheme 300. In the TC synchronization scheme 300, packet timestamps may be used to achieve time network synchronization between two nodes, e.g., absolute time synchronization. The TC synchronization scheme 300 may comprise an AN 302, a first PTP engine 304, a customer premise node 306, a second PTP engine 308, a first interface 310, a second interface 312, a first timestamp module 332 and a second timestamp module 334. The components of the TC synchronization scheme 300 may be arranged as shown in FIG. 3.

The AN 302 may comprise a local clock that may be synchronized to a Master Clock of the network. The AN 302 and the customer premise node 306 may be coupled to a communication link (not shown) via the first interface (i.e., a network facing interface) 310 and the second interface (i.e., a customer side facing interface) 312 which may be port-facing interfaces. The first interface 310 may be located at a determined point facing an ingress port in the AN 302 and the second interface 312 may be located at a determined point facing an egress port in the customer premise node 306. Specifically, the first interface 310 may be coupled to the network and the second interface 312 may be coupled to a customer node or device. The first PTP engine 304 may operate at an upper network layer of the AN 302, and similarly the second PTP engine 308 may operate at the upper network layer of the customer premise node 306.

Initially, the AN 302 may transmit a PTP event message 322 to the customer premise node 306. When the PTP event message 322 transverses or crosses the first interface 310, the first PTP engine 304 may trigger the first timestamp module 332 in the AN 302 to create a first timestamp, T1, based on the local clock of the AN 302 and transmit T1 to the customer premise node 306. In an embodiment, T1 may be transmitted in an Embedded Operations Channel (EOC) message. In another embodiment, T1 may be transmitted via an in-band mechanism. When the PTP event message 322 reaches the customer premise node 306 and crosses the second interface 312, the second PTP engine 308 may trigger the second timestamp module 334 in the customer premise node 306 to create a second timestamp, T2, using the local clock of the customer premise node 306, which may also be synchronized to the Master Clock of the network. The customer premise node 306 may receive T1 and compute a residence time based on T1 and T2. The residence time may be about equal to the difference between T1 and T2. After receiving the PTP packet 322 and computing the residence time, the customer premise node 306 may add or update a correction field in a PTP packet header in the PTP event message 322. The updated PTP event message 322 may then be forwarded or used for achieving time synchronization in the network based on the TC scheme.

In an embodiment, the TC synchronization scheme 300 may be implemented in a PON, such as the PON 100. For example, the AN 302 may correspond to the OLT 110, and the customer premise node 306 may correspond to an ONU 120. The first interface 310 may be a service node interface (SNI) or a V reference point, e.g., at the OLT 110, and the second interface 312 may be a user network interface (UNI) or a T reference point, e.g., at the ONU 120. In another embodiment, the TC clock synchronization scheme 300 may be implemented in a DSL system, such as the DSL system 200. For example, the AN 302 may correspond to the Exchange 202 or the Cabinet 204, and the customer premise node 306 may correspond to a CPE 206. The first interface 310 may be a $\gamma_0$ interface, e.g., at the Exchange 202 or the Cabinet 204, and the second interface 312 may be a $\gamma_R$ interface, e.g., at the CPE 206.

Figure 4:
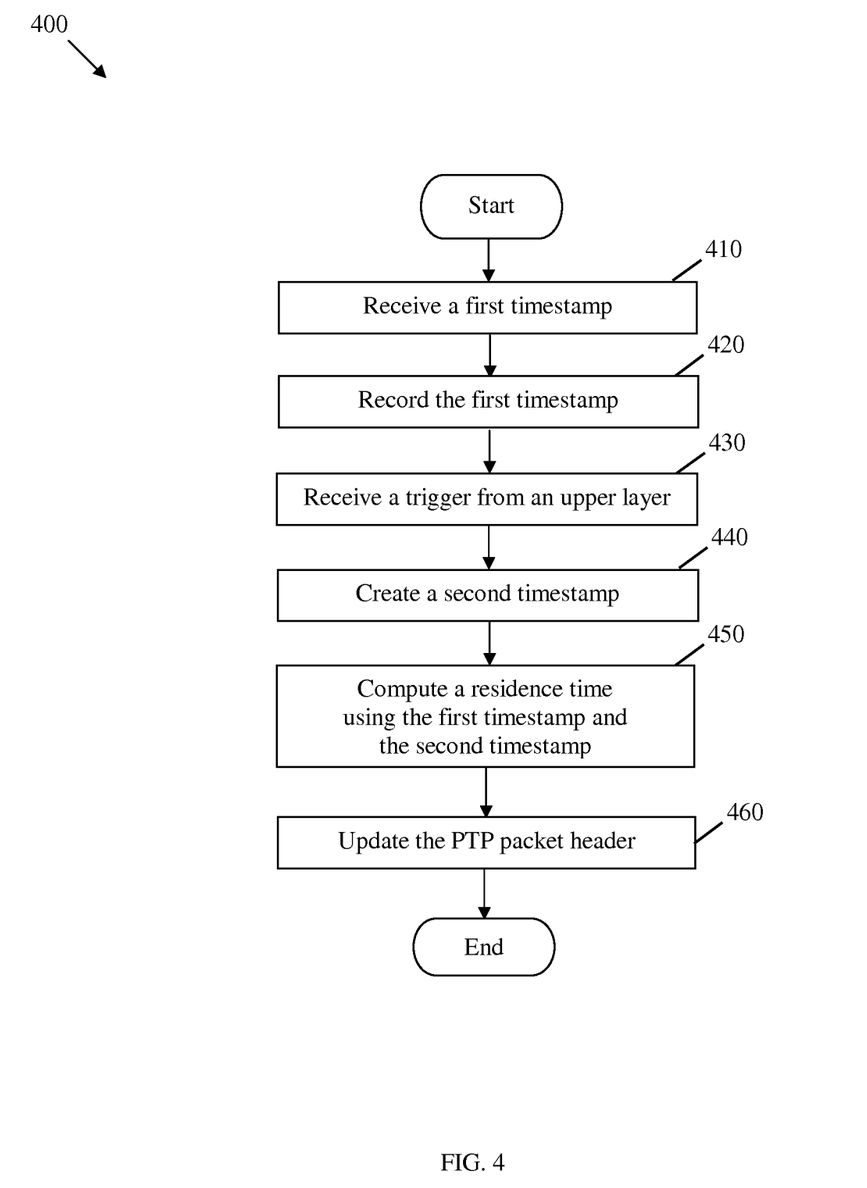
FIG. 4 is a flowchart of an embodiment of a TC implementation method.

FIG. 4 illustrates an embodiment of a transparent clock method 400 for a mobile backhaul system, such as a PON or a DSL system. The method 400 may be implemented by a costumer node, e.g., an ONU 120 or a CPE 206. The method 400 may begin at block 410, where a first timestamp, (e.g., T1), may be received. The first timestamp may be received from an AN, e.g., the OLT 110 or the Exchange 202. The first timestamp may be created based on a local clock of the AN, after receiving a trigger from an upper network layer at the AN, e.g., a PTP engine, to indicate that a PTP event message, e.g., the PTP event message 322, has crossed a network facing interface, e.g., the first interface 310. At block 420, the first timestamp may be recorded, e.g., in a local memory coupled to the costumer node. At block 430, the costumer node may receive a trigger from an upper network layer at the customer node, e.g., a PTP engine. The trigger may be received from the upper network layer to indicate that the PTP event message has crossed a customer facing interface, e.g., the second interface 312. At block 440, a second timestamp, (e.g., T2), may be created. The second timestamp may be created based on a local clock of the customer premise node. At block 450, a residence time may be computed using the first timestamp and the second timestamp. The residence time may be about equal to the difference between the first timestamp and the second timestamp. At block 460, a PTP packet header of the PTP event message may be updated. Updating the PTP packet header may comprise inserting the residence time into a correction field in the PTP packet header. The method 400 may then end.

Figure 5:
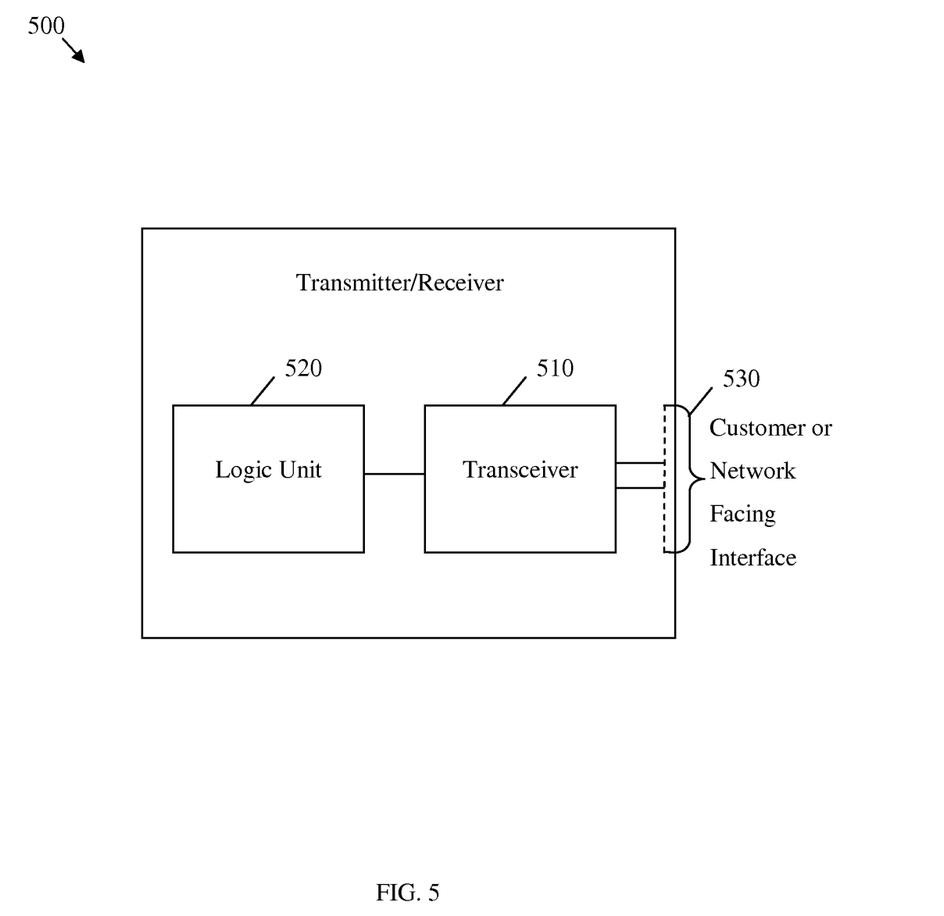
FIG. 5 is a schematic diagram of an embodiment of a network unit.

FIG. 5 illustrates an embodiment of a network unit 500, which may be any device that transports data through a network. The network unit 500 may also implement the transparent clock method 400. For instance, the network unit 500 may be located at the AN, the customer premise node, or both. The network unit 500 may comprise a transmitter/receiver (or transceiver) 510 for transmitting/receiving sequences of data that comprise bits or words, a logic circuitry 520 to perform transceiver data operations, and an interface 530 for communicating the data with other network components. The logic unit 520 may implement logic to create, examine and process the timestamps and communication packets, as shown above. Logic unit 520 may be implemented as hardware, software, or some combination of the two. The interface 530 may be a network facing interface for receiving data when the network unit 500 is located at an AN and may be coupled to a network (e.g., via a link). Alternatively, the interface 530 may be a customer facing interface for forwarding data when the network unit 500 is located in a customer premise node and may be coupled to a customer device (via a link).

Figure 6:
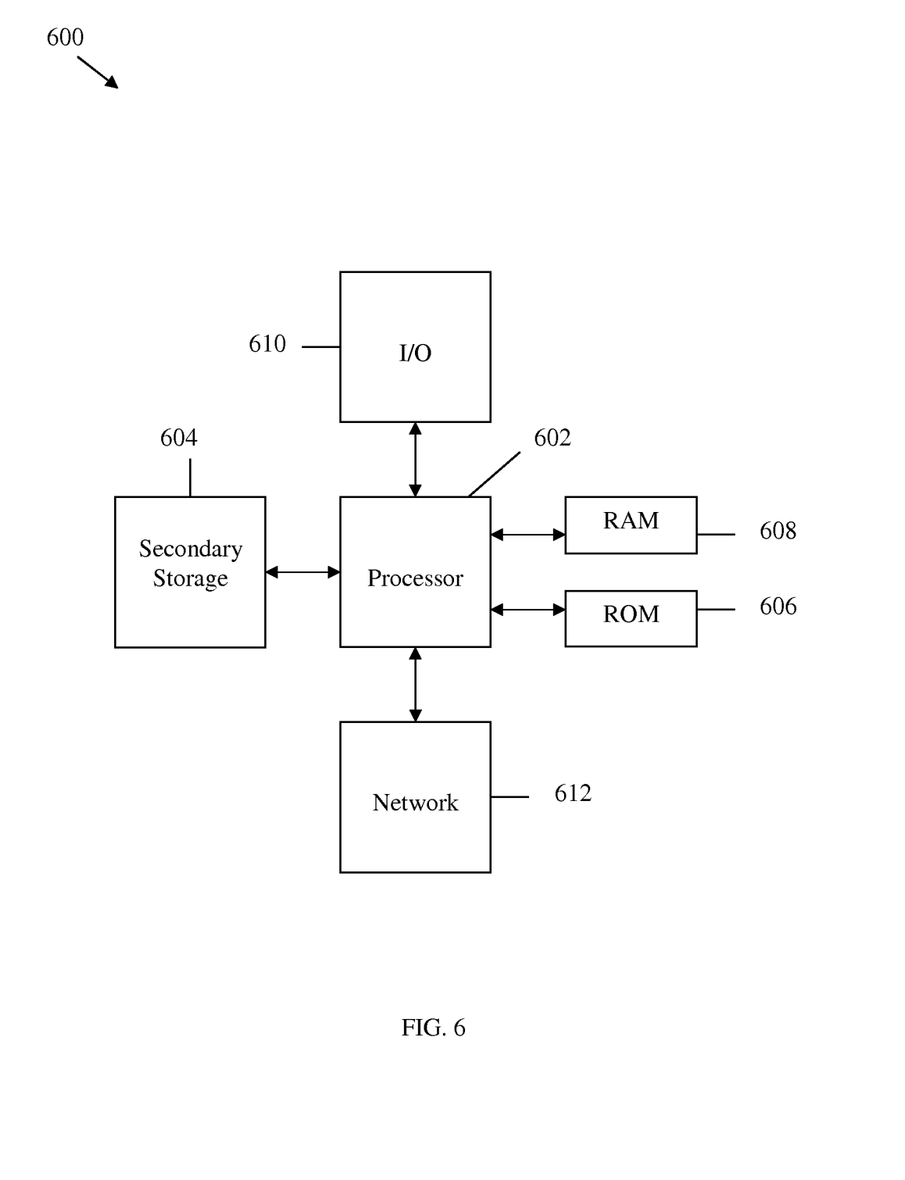
FIG. 6 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more Application-Specific Integrated Circuits (ASICs).

The secondary storage 604 is typically comprised of one or more disk drives or tape drives and is used for non-volatile storage of data and as an overflow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for implementing a transparent clock (TC), the apparatus comprising:
    a device at a customer node configured to couple to an access node (AN), the device comprising an interface, a Precision Time Protocol (PTP) engine, and a timestamp module,
    wherein the device is configured to:
    receive a PTP event message from the AN;
    receive a timestamp generated when the PTP event message transverses a second interface of the AN,
    wherein the PTP engine is configured to trigger the timestamp module to create a second timestamp when the PTP event message transverses the interface, and wherein the timestamp and the second timestamp are used to obtain a residence time between the AN and the customer premise node; and
    update the PTP event message using the residence time.

2. The apparatus of claim 1, wherein the AN is an optical line terminal (OLT), and wherein the customer premise node is an optical network unit (ONU) in a Passive Optical Network (PON).

3. The apparatus of claim 1, wherein the AN is located at a central office (CO) in a Digital Subscriber Line (DSL) system, and wherein the customer premise node is a customer premises equipment (CPE).

4. The apparatus of claim 1, wherein the PTP engine detects the PTP event message traversing the interface and triggers the timestamp module at an upper network layer operating at the customer premise node.

5. The apparatus of claim 1, wherein the timestamp is based on a local clock of the AN, and wherein the timestamp module generates the second timestamp based on a second local clock of the customer premise node.

6. The apparatus of claim 5, wherein the local clock and the second local clock are synchronized to a master clock.

7. The apparatus of claim 1, wherein the second interface is a network facing interface at the AN, and wherein the interface is a customer facing interface at the customer premise node.

8. The apparatus of claim 7, wherein the network facing interface is a service node interface (SNI) or a V reference point in an optical line terminal (OLT), and wherein the customer facing interface is a user network interface (UNI) or a T reference point in an optical network unit (ONU).

9. The apparatus of claim 7, wherein the network facing interface is a $\gamma_0$ interface in a Digital Subscriber Line (DSL) central office (CO), and wherein the network facing interface is a $\gamma_R$ interface in a customer premises equipment (CPE).

10. A network component for implementing a transparent clock scheme, the network comprising:
    a receiver configured to receive a Precision Time Protocol (PTP) event message and a first timestamp from an access node (AN);
    a logic circuit configured to create a second timestamp based on a local clock upon receiving a trigger from an upper network layer operating at the network component and update a header in the PTP event message based on the first timestamp and the second timestamp; and
    a transmitter configured to forward the PTP event message with the updated header.

11. The network component of claim 10, wherein the logic circuit receives from the upper network layer the trigger when the PTP event message transverses a customer facing interface.

12. The network component of claim 10, wherein the first timestamp is sent in an embedded operations channel (EOC) message.

13. The network component of claim 10, wherein the first timestamp is sent via an in-band mechanism from the AN.

14. The network component of claim 10, wherein the logic circuit at the network component and the AN are configured to implement a PTP defined in the Institute of Electrical and Electronics Engineers (IEEE) 1588-2008 standard based on updating a header comprising a residence time.

15. In a network apparatus in a mobile backhaul network, a method for implementing a transparent clock, the method comprising:
    receiving a first timestamp from a network node;
    receiving a trigger from an upper network layer upon detecting a received Precision Time Protocol (PTP) event message;
    creating, with a processor, a second timestamp;
    computing, with the processor, a residence time based on the first timestamp and the second timestamp;
    updating, with the processor, a header in the PTP event message with the residence time; and
    forwarding the PTP event message.

16. The method of claim 15, wherein the updating the header in the PTP event message comprises inserting the residence time into a correction field in the header.

17. The method of claim 16, wherein the residence time is equal to about the difference between the second timestamp and the first timestamp.

* * * * *

UNITED STATES PATENT AND TRADEMARK OFFICE
CERTIFICATE OF CORRECTION

PATENT NO. : 8,625,640 B2
APPLICATION NO. : 13/194519
DATED : January 7, 2014
INVENTOR(S) : Dong Wei It is certified that error appears in the above-identified patent and that said Letters Patent is hereby corrected as shown below:

Title Page 2, Col. 1, References Cited, under Other Publications, the following cited art should read:

"Series G: Transmission Systems and Media Digital Systems and Networks, Digital Sections and Digital Line System- Access Networks, Very High Speed Digital Subscriber Line Transceivers 2 (VDSL2)," ITU-T G. 993.2, Feb. 2006, 252 pages.

Foreign Communication From a Related Counterpart Application, PCT Application PCT/CN2011/077876, International Search Report, dated Oct. 27, 2011, 3 pages.

Goodson, R., et al., "Proposal for Discrete Transparent Clock Mechanism for XGPON", Study Group 15, Question 2, Working Party 1, Conference Call, Document R-C-TD, Oct. 12, 2010, 7 pages.

HAN, J., et al., "A Clock Synchronization System with IEEE 1588-2008 Adapters over Existing Gigabit Ethernet Equipment," XP31725216A, Proceedings of 2010 IEEE International Symposium on Circuits and Systems (ISCAS), May 30 - Jun. 2, 2010, pp. 193-196.

RODRIGUES, S., "IEEE-1588 and Synchronous Ethernet in Telecom," XP31161293A, International IEEE Symposium on Precision Clock Synchronization (ISPCS) for Measurement, Control and Communication, Vienna, Austria, Oct. 1-3, 2007, pp. 138-142.

Signed and Sealed this
Eleventh Day of March, 2014

Michelle K. Lee
*Deputy Director of the United States Patent and Trademark Office*